United States Patent
Chatterji et al.

(10) Patent No.: US 7,143,827 B2
(45) Date of Patent: *Dec. 5, 2006

(54) WELL COMPLETION SPACER FLUIDS CONTAINING FIBERS AND METHODS

(75) Inventors: Jiten Chatterji, Duncan, OK (US); Dennis W. Gray, Comanche, OK (US); Bobby J. King, Duncan, OK (US); John L. Dennis, Jr., Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 266 days.

This patent is subject to a terminal disclaimer.

(21) Appl. No.: 10/740,189

(22) Filed: Dec. 18, 2003

(65) Prior Publication Data

US 2004/0182577 A1  Sep. 23, 2004

Related U.S. Application Data

(63) Continuation-in-part of application No. 10/393,965, filed on Mar. 21, 2003, now Pat. No. 6,668,927.

(51) Int. Cl.
*E21B 37/00* (2006.01)
*E21B 37/16* (2006.01)

(52) U.S. Cl. ............ 166/291; 166/309; 166/312; 507/202; 507/219; 507/221; 507/928

(58) Field of Classification Search ............ 166/291, 166/309, 312; 507/202, 213, 216, 219, 221, 507/225, 228, 269, 271, 906, 928
See application file for complete search history.

(56) References Cited

U.S. PATENT DOCUMENTS

| | | | | |
|---|---|---|---|---|
| 3,846,316 | A | 11/1974 | Motley et al. | |
| 4,083,407 | A * | 4/1978 | Griffin et al. | 166/291 |
| 4,093,028 | A * | 6/1978 | Brandon | 166/281 |
| 4,141,843 | A | 2/1979 | Watson | 166/293 |
| 4,217,229 | A | 8/1980 | Watson | |
| 4,474,240 | A * | 10/1984 | Oliver et al. | 166/312 |
| 4,646,834 | A * | 3/1987 | Bannister | 166/291 |
| 4,844,164 | A * | 7/1989 | Shen | 166/291 |
| 4,869,321 | A * | 9/1989 | Hamilton | 166/277 |
| 4,899,819 | A | 2/1990 | Hazlett et al. | 166/285 |
| 5,552,377 | A | 9/1996 | Kindred | 507/209 |
| 5,716,910 | A | 2/1998 | Totten et al. | 507/102 |
| 5,789,352 | A | 8/1998 | Carpenter et al. | 507/209 |
| 5,820,670 | A | 10/1998 | Chatterji et al. | 106/727 |
| 5,851,960 | A | 12/1998 | Totten et al. | 507/118 |
| 5,866,517 | A | 2/1999 | Carpenter et al. | 507/226 |
| 5,875,845 | A | 3/1999 | Chatterji et al. | 166/293 |
| 5,897,699 | A | 4/1999 | Chatterji et al. | 106/678 |
| 6,059,035 | A | 5/2000 | Chatterji et al. | 166/293 |
| 6,059,036 | A | 5/2000 | Chatterji et al. | 166/294 |
| 6,063,737 | A | 5/2000 | Haberman et al. | 507/261 |
| 6,063,738 | A | 5/2000 | Chatterji et al. | 507/269 |
| 6,090,754 | A | 7/2000 | Chan et al. | 507/110 |
| 6,138,760 | A | 10/2000 | Lopez et al. | 166/300 |
| 6,210,476 | B1 | 4/2001 | Chatterji et al. | 106/677 |
| 6,220,354 | B1 | 4/2001 | Chatterji et al. | 166/293 |
| 6,221,152 | B1 * | 4/2001 | Dial et al. | 106/805 |
| 6,297,202 | B1 * | 10/2001 | Chatterji et al. | 507/261 |
| 6,308,777 | B1 | 10/2001 | Chatterji et al. | 166/293 |
| 6,500,252 | B1 | 12/2002 | Chatterji et al. | 106/644 |
| 6,554,069 | B1 | 4/2003 | Chatterji et al. | 166/291 |
| 6,668,927 | B1 | 12/2003 | Chatterji et al. | 166/291 |

FOREIGN PATENT DOCUMENTS

| | | |
|---|---|---|
| EP | 0 430 644 A1 | 6/1994 |
| EP | 0 814 232 A1 | 12/1997 |
| WO | WO 96/40599 | 12/1996 |

OTHER PUBLICATIONS

Foreign communication from a related counterpart application dated Jul. 5, 2004.
Foreign communication from a related counterpart application dated Mar. 15, 2005.

* cited by examiner

*Primary Examiner*—George Suchfield
(74) *Attorney, Agent, or Firm*—Craig W. Roddy; Baker Botts L.L.P.

(57) ABSTRACT

Well completion spacer fluids containing fibers and methods of using the spacer fluids are provided. A method of the invention for displacing a first fluid from a well bore with an incompatible second fluid comprises the following steps. A spacer fluid is placed between the first and second fluids to separate the first and second fluids and to remove the first fluid from the walls of the well bore. Thereafter, the first fluid and the spacer fluid are displaced from the well bore with the second fluid. The spacer fluid comprises water, a weighting material, a dispersing agent, a suspending agent and friction reducer and fibers. The spacer fluid containing the components mentioned above is preferably also foamed.

80 Claims, 1 Drawing Sheet

WELL COMPLETION SPACER FLUIDS CONTAINING FIBERS AND METHODS

CROSS REFERENCE TO RELATED APPLICATIONS

This application is a continuation-in-part of U.S. application Ser. No. 10/393,965 filed on Mar. 21, 2003 now U.S. Pat. No. 6,668,927.

BACKGROUND OF THE INVENTION

1. Field of the Invention

The present invention relates to spacer fluids containing fibers and methods of using the spacer fluids in well completions such as primary cementing.

2. Description of the Prior Art

Well bores are commonly drilled using the rotary drilling method. In that method, a drill bit connected to a drill string is rotated while drilling fluid is circulated through the drill string, through the drill bit and upwardly to the surface through the annulus between the drill string and the walls of the well bore being drilled. The drilling fluid functions to cool the drill bit, to remove cuttings from the well bore and to maintain hydrostatic pressure on the well bore. The hydrostatic pressure prevents formation fluids from entering the well bore during drilling.

The drilling fluid also forms a filter cake on the walls of the well bore which prevents the drilling fluid from being lost into permeable subterranean zones. However, the drilling fluid in the filter cake dehydrates and gels thereby forming a layer of solids and gelled drilling fluid on the walls of the well bore. While this filter cake is advantageous during drilling, it is detrimental to obtaining effective drilling fluid displacement and removal from the walls of the well bore.

In primary well cementing operations, a hydraulic cement slurry is pumped into the annular space between the walls of the well bore and the exterior surfaces of a pipe string disposed therein. The cement slurry is allowed to set in the annular space thereby forming an annular sheath of hardened substantially impermeable cement therein. The cement sheath physically supports and positions the pipe in the well bore and bonds the exterior surfaces of the pipe to the walls of the well bore whereby the undesirable migration of fluids between zones or formations penetrated by the well bore is prevented. If the drilling fluid filter cake is not adequately removed from the walls of the well bore or portions thereof, a competent seal between the hardened cement and the well bore does not result.

Spacer fluids are typically placed between two fluids contained or to be pumped within well bores. Examples of fluids between which spacer fluids are utilized include between hydraulic cement slurries and drilling fluids, between different drilling fluids during drilling fluid change-outs and between drilling fluids and completion brines. The spacers are also utilized to enhance drilling fluid and filter cake removal from the walls of well bores, to enhance displacement efficiency and to physically separate chemically incompatible fluids. For example, a hydraulic cement slurry and drilling fluid are separated by a spacer fluid when the cement slurry is placed in the annulus between a pipe string and the walls of a well bore. The spacer fluid prevents intermixing of the cement slurry and the drilling fluid and facilitates the removal of filter cake and gelled drilling fluid from the walls of the well bore during displacement of the drilling fluid by the cement slurry. If intermixing of the cement slurry and the drilling fluid occurs, viscous masses are formed in the annulus that prevent continued displacement.

The heretofore utilized spacer fluids have achieved varying degrees of success in displacing fluids and removing filter cake, gelled drilling fluid and the like from the walls of the well bore. However, there is a continuing need for improved spacer fluids that achieve greater removal of drilling fluid and filter cake from the walls of the well bore and prevent mixing of incompatible fluids.

SUMMARY OF THE INVENTION

The present invention provides improved water based well completion spacer fluids containing fibers and methods of using the spacer fluids which meet the need described above and overcome the deficiencies of the prior art. The presence of fibers in the spacer fluids of this invention increases the drilling fluid and filter cake removal from the walls of a well bore as a result of the fibers imparting abrasive properties to the spacer fluids. In addition, the spacer fluids are preferably foamed which increases the drilling fluid and filter cake removal. That is, the foamed spacer fluids of this invention exhibit better drilling fluid and drilling fluid filter cake removal as a result of the gas in the foamed spacer fluids energizing the fluids. The gas bubbles are compressed as a foamed spacer fluid is pumped down the pipe string and the hydrostatic pressure increases. As the foamed spacer fluid enters the annulus and is pumped toward the surface, the hydrostatic pressure decreases which allows the gas bubbles to expand and cause the foamed spacer fluid to achieve highly efficient drilling fluid and filter cake removal from the annulus. The expansion of the gas bubbles also allows the foamed spacer fluid and fibers therein to enter irregular hole configurations and enlarged holes in the well bore and remove drilling fluid and filter cake therefrom. Finally, the increased viscosity of a foamed spacer fluid provides enhanced suspension of removed drilling fluid and filter cake. The water-based spacer fluids of this invention are particularly well suited for displacing water-based drilling fluids and other water-based fluids, but they can also be used effectively in the removal of oil based drilling fluids and other oil based fluids. When a foamed spacer fluid of this invention contacts an oil based drilling fluid, the foamed spacer fluid will convert to a non-foamed spacer fluid. However, it is believed that the released gas enters the filter cake which in conjunction with the fibers in the spacer fluid facilitates the removal of the filter cake.

The spacer fluids of this invention basically comprise water, a weighting material, a dispersing agent, a suspending agent and friction reducer, and fibers. The foamed spacer fluids comprise water, a weighting material, a dispersing agent, a suspending agent and friction reducer, fibers, a foaming and foam stabilizing surfactant or mixture of surfactants and a gas.

The methods of this invention basically comprise the following steps. A spacer fluid is placed between first and second fluids in a well bore to separate the first and second fluids and to remove the first fluid from the walls of the well bore, the spacer fluid comprising water, a weighting material, a dispersing agent, a suspending agent and friction reducer, and fibers. Thereafter, the first fluid and the spacer fluid are displaced from the well bore by the second fluid.

A preferred method of the invention comprises the following steps. A foamed spacer fluid is placed between first and second fluids in a well bore to separate the first and second fluids and to remove the first fluid from the walls of the well bore, the spacer fluid comprising water, a weighting material, a dispersing agent, a suspending agent and friction reducer, fibers, a foaming and foam stabilizing surfactant or mixtures of surfactants and a gas. Thereafter, the first fluid and the spacer fluid are displaced from the well bore by the second fluid.

The objects, features and advantages of the present invention will be readily apparent to those skilled in the art upon a reading of the description of preferred embodiments which follows.

BRIEF DESCRIPTION OF THE DRAWING

A more complete understanding of the present disclosure and advantages thereof may be acquired by referring to the following description taken in conjunction with the accompanying drawing.

DESCRIPTION OF PREFERRED EMBODIMENTS

Figure 1:
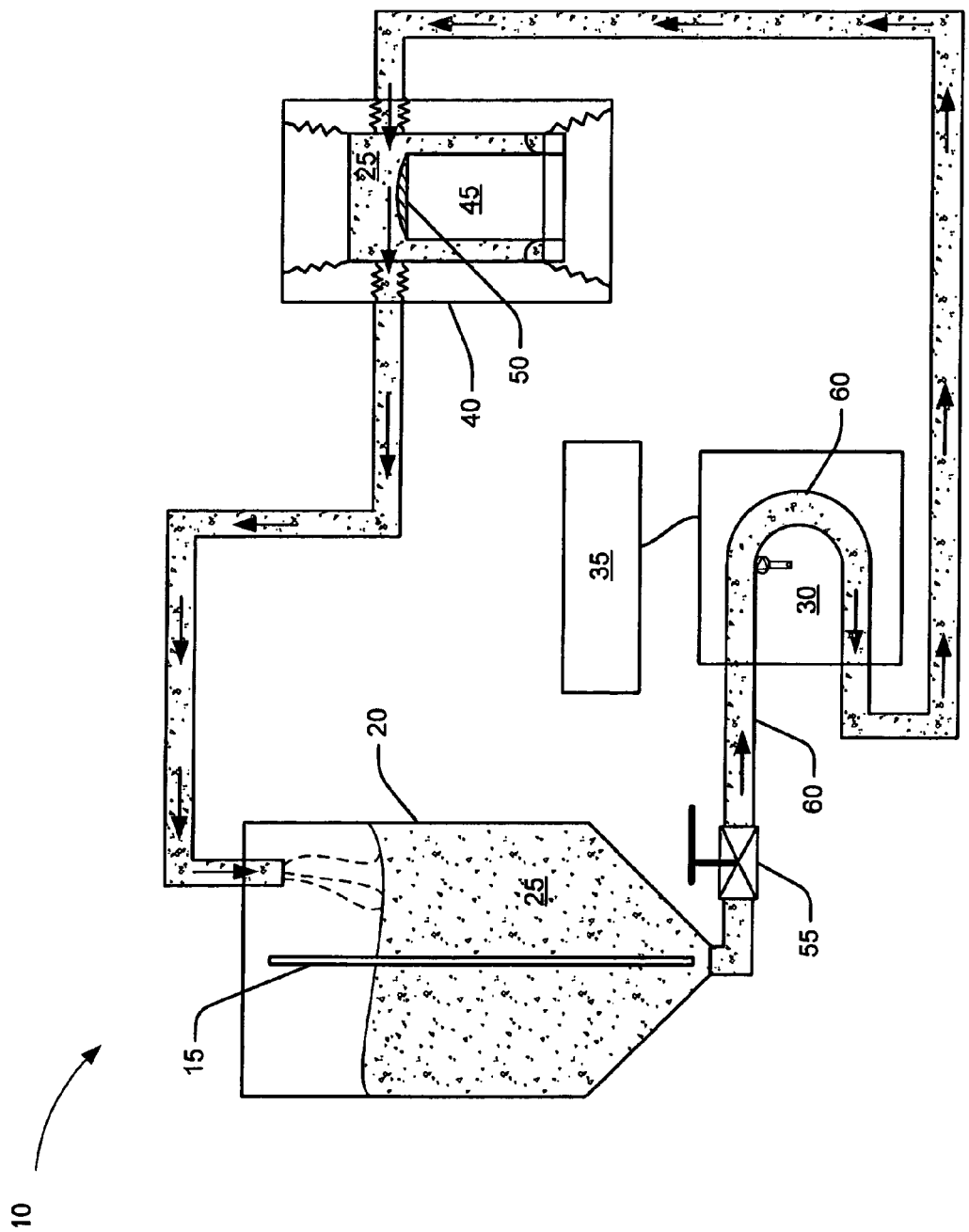
FIG. 1 is a diagram of the spacer fluid efficiency test apparatus used in the examples outlined in the Description of Preferred Embodiments, with the results listed in Table I.

As stated above, the spacer fluids of this invention basically comprise water, a weighting material, a dispersing agent, a suspending agent and friction reducer, and fibers. A more preferred foamed spacer fluid comprises water, a weighting material, a dispersing agent, a suspending agent and friction reducer, fibers, a foaming and foam stabilizing surfactant or mixtures of surfactants and a gas.

The water in the spacer fluids of this invention can be fresh water or salt water. The term "salt water" is used herein to mean unsaturated salt solutions and saturated salt solutions including brines and seawater.

Examples of weighting materials that can be utilized in the spacer fluids include, but are not limited to, barium sulfate, hematite, manganese tetraoxide and calcium carbonate. Of these, barium sulfate is preferred. The weighting material is included in the spacer fluids in an amount in the range of from about 0 pounds to about 745 pounds per barrel of water therein.

The dispersing agent is included in the spacer fluids to disperse the solids and other materials in the water. Examples of dispersing agents that can be utilized include, but are not limited to, naphthalene sulfonate condensed with formaldehyde, sodium polyacrylate, a terpolymer of acrylic acid, alkyloxybenzene sulfonate and methally sulfonate, formaldehyde, acetone, bisulfite condensate, melamine sulfonate formaldehyde condensate, and mixtures thereof. The dispersing agent is included in the spacer fluid in an amount in the range of from about 0.5% to about 5% by weight of the water therein.

The suspending agent and friction reducer is included in the spacer fluid to suspend the weighting material and other solids therein as well as to reduce friction during pumping of the spacer fluid. Examples of suspending agent and friction reducers that can be utilized include, but are not limited to, sepiolite, whelan gum, xanthan gum, hydroxyethylcellulose, bentonite, attapulgite, and mixtures thereof. Of these, xanthan gum is preferred. The suspending agent and friction reducer is included in the spacer fluid in an amount in the range of from about 2 pounds to about 10 pounds per barrel of water therein.

A variety of fibers can be utilized in the present invention. Examples of preferred such fibers include, but are not limited to, polyester fibers, polyamide fibers, polyethylene fibers, polypropylene fibers, and other polyolefin fibers. The fibers can be made hydrophilic by treating them with a surface active agent. Of the foregoing, hydrophilic polypropylene fibers are most preferred. The fibers are included in the spacer fluid in an amount in the range of from about $\frac{1}{16}$ pound to about $\frac{1}{4}$ pound per barrel of spacer fluid.

When the spacer fluid is a foamed spacer fluid, a foaming and foam stabilizing surfactant that functions to facilitate the formation of a foam and to stabilize the foam during its use is included in the spacer fluid. While various such surfactants known to those skilled in the art can be used, presently preferred such surfactants include, but are not limited to, a mixture of an ethoxylated alcohol ether sulfate surfactant, an alkyl or alkene amidopropyl betaine surfactant and an alkyl or alkene amidopropyl dimethyl amine oxide surfactant or a mixture of an alpha-olefinic sulfonate surfactant and an alkyl or alkene amidopropyl betaine surfactant. Of these, the mixture of an ethoxylated alcohol ether sulfate surfactant, an alkyl or alkene amidopropyl betaine surfactant and an alkyl or alkene amidopropyl dimethyl amine oxide surfactant is preferred. This mixture and others are described in detail in U.S. Pat. Nos. 6,063,738; 6,210,476; 5,897,699; 5,875,845; and 5,820,670 issued to Chatterji, et al. which are incorporated herein by reference thereto. The mixture of foaming and foam stabilizing surfactants is included in the foamed spacer fluid in an amount in the range of from about 0.5% to about 5% by weight of the water therein.

Also, when the spacer fluid is foamed, a gas such as air or nitrogen is included in the spacer fluid. The gas is preferably nitrogen and the gas is present in the foamed spacer fluid in an amount in the range of from about 5% to about 80% by volume of the water therein.

The spacer fluids of this invention can also optionally include a well bore scouring material to facilitate the removal of filter cake and gelled drilling fluid from the walls of the well bore. Examples of suitable scouring materials include, but are not limited to, diatomaceous earth, crystalline silica, amorphous silica, and mixtures thereof. Of these, crystalline silica scouring material is preferred. When used, the scouring material is present in the spacer fluid in an amount in the range of from about 10 pounds to about 80 pounds per barrel of water therein.

Also, when the spacer fluid is not foamed, it can optionally include a defoamer comprising oil and silica present in an amount in the range of from about 0.5% to about 2% by weight of the water therein.

As mentioned above, the spacer fluids of this invention are particularly useful in primary cementing operations wherein the foamed spacer fluid is placed between a drilling fluid and a hydraulic cement slurry. The drilling fluid can be a water-based drilling fluid, an oil based drilling fluid or a foamed water or oil based drilling fluid.

The hydraulic cement slurry can include various cements including Portland cements, slag cements, pozzolana cements, gypsum cements, aluminous cements, silica cements or high alkalinity cements. Of these, Portland cement is generally preferred. The water in the hydraulic cement slurry can be fresh water or salt water.

When the spacer fluid of this invention is batch mixed on the surface, a spacer mixing aid is added to the spacer fluid in a small amount to facilitate complete suspension of the heavy weight materials therein. The spacer mixing aid comprises 39.5% xanthan gum, 48.3% mineral oil, 2.7% oleophilic clay; 5.9% nonylphenol ethoxylated with 3 moles of ethylene oxide, and 3.9% naphthalene sulfonate condensed with formaldehyde (percents are by weight). The spacer mixing aid is not required when the spacer fluid is mixed on-the-fly.

A preferred method of this invention for displacing a first fluid from a well bore with an incompatible second fluid comprises the steps of: (a) placing a spacer fluid between the first and second fluids to separate the first and second fluids and to remove the first fluid from the walls of the well bore, the spacer fluid comprising water, a weighting material, a dispersing agent, a suspending agent and friction reducer, and fibers; and (b) displacing the first fluid and the foamed spacer fluid from the well bore with the second fluid.

A preferred method of displacing drilling fluid from a well bore with a hydraulic cement slurry comprises the steps of: (a) placing a foamed spacer fluid between the drilling fluid and the hydraulic cement slurry to separate the drilling fluid from the hydraulic cement slurry and to remove the drilling fluid and filter cake from the walls of the well bore, the foamed spacer fluid comprising water, a weighting material, a dispersing agent, a suspending agent and friction reducer, fibers, a foaming and foam stabilizing surfactant and a gas; and (b) displacing the drilling fluid and the foamed spacer fluid from the well bore with the hydraulic cement slurry.

A preferred spacer fluid of this invention comprises: water; a weighting material; a dispersing agent; a suspending agent and friction reducer; and fibers.

A preferred foamed spacer fluid of this invention comprises: water; a weighting material; a dispersing agent; a suspending agent and friction reducer; fibers; a foaming and foam stabilizing surfactant; and a gas.

In order to further illustrate the methods and foamed spacer fluids of this invention, the following examples are given.

FIG. 1 is a diagram of spacer fluid efficiency test apparatus 10. Test apparatus 10 consists of reservoir 20. variable speed pump 30, test cell 40 containing core 45 with filter cake 50 deposited thereon, and flexible tubing 60 connecting the various components. Various spacer fluids were tested using spacer fluid efficiency test apparatus 10 designed to indicate how efficiently a spacer fluid will erode filter cake 50 from formation core 45. The test procedure followed to evaluate the efficiency of the spacer to remove the filter cake from the core is set forth below.

Filter cake 50 is deposited on core 45 using a standard API high pressure fluid loss apparatus. Core 45 containing deposited filter cake 50 is removed from the fluid loss test apparatus and rinsed by pouring water over it gently. The weight of core 45 and filter cake 50 is determined thereafter. Thereafter, core 45 with filter cake 50 is mounted on test cell 40 shown in test apparatus 10 in FIG. 1.

Spacer 25 to be tested is poured into reservoir 20. Pump speed controller 35 is adjusted to allow pump 30 to move spacer 25 through flexible tubing 60 and across filter cake 50 at a rate of 3.3 liters per minute. The inlet and outlets for the flow of spacer 25 through test cell 40 is level with the top of core 45. The circulation of spacer 25 is continued for 40 minutes, and at the end of the 40 minutes, the circulation is stopped.

Thereafter, test cell 40 is disassembled by removing the bottom end holding core 45 with filter cake 50 on it. The sides of core 45 are rinsed using the same procedure as at the start of the test. The top of filter cake 50 is rinsed by gently pouring water over it to remove loose spacer, the same as was done to remove loose drilling fluid at the beginning of the test. The weight of core 45 and filter cake 50 is then determined. Filter cake 50 is then removed from core 45 and the weight of core 45 (without filter cake 50) is determined.

The percent of filter cake 50 removed is then determined by:

$$\% \ Rem = \frac{CW_B - CW_A}{CW_B}$$

Where % Rem is the percent filter cake removed, $CW_B$ is the filter cake weight before exposure to spacer, and $CW_A$ is the filter cake weight after exposure to spacer.

EXAMPLE 1

A first spacer fluid (Spacer 1) having a density of 16 pounds per gallon was prepared comprising water; 39.23% by weight of water of diatomaceous earth scouring material; 35.0% by weight of water of crystalline sand scouring material; 11.76% by weight of water of sepiolite suspending agent and friction reducer; 9.8% by weight of water of naphthalene sulfonate condensed with formaldehyde dispersing agent; 1.96% by weight of water of an oil and silica defoaming agent; and 1 gallon of spacer mixing aid blend per 10 barrels of mixing water. To the first spacer fluid, ⅛ pound of hydrophilic polypropylene fibers per barrel of spacer fluid was added. The spacer mixing aid blend is included in the spacer when it is batch mixed.

A 16 pound per gallon spacer fluid (Spacer 1) having the same composition as the first spacer fluid described above without the fibers was prepared and foamed with 2% by weight of a surfactant mixture comprising an ethoxylated alcohol either sulfate, an alkyl or alkene amidopropyl betaine and an alkyl or alkene amidopropyl dimethyl amine oxide to 10, 12 and 14 pound per gallon foamed spacer fluids. 10, 12 and 14 pound per gallon foamed spacer fluids with hydrophilic polypropylene fibers were also prepared.

A second spacer fluid (Spacer 2) having a density of 16 pounds per gallon was prepared comprising water; 6.0% by weight of water of sodium polyacrylate dispersing agent; 3.75% by weight of water of a terpolymer of acrylic acid, alkoxybenzene sulfonate and methally sulfonate dispersing agent; 1.5% by weight of water of whelan gum suspending agent and friction reducer; 0.5% by weight of water of hydroxyethylcelluclose suspending agent and friction reducer; 22.5% by weight of water of sepiolite suspending agent and friction reducer; 66.0% by weight of water of amorphous silica. To the second spacer fluid, ⅛ pound of hydrophilic polypropylene fibers per barrel was added.

A 16 pound per gallon spacer fluid (Spacer 2) having the same composition as the second spacer fluid described above without the fibers was prepared and foamed with the same surfactant mixture described above to 10, 12 and 14 pound per gallon foamed spacer fluids. 10, 12 and 14 pound per gallon foamed spacer fluids with hydrophilic polypropylene fibers were also prepared.

The results of spacer fluid efficiency tests using the test apparatus described above are set forth in Table I below (Spacer 1 and 11 pound per gallon water based drilling fluid to deposit filter cake) and Table II below (Spacer 2 and 12.5 pound per gallon water based drilling fluid to deposit filter cake).

TABLE I

Filter Cake Erosion By Spacer 1 Fluids With and Without Fibers

| Drilling Fluid Filter Cake Weight, grams | Spacer 1 Fluid Tested | Weight of Drilling Fluid After Spacer 1 Circulation, grams | Percent of Filter Cake Removal After Spacer 1 Circulation |
|---|---|---|---|
| 24 | 14 lb/gal (No Fibers) | 24 | 0 |
| 22 | 14 lb/gal (With Fibers) | 20 | 10 |
| 19 | 14 lb/gal (Foamed, No Fibers) | 15 | 21 |
| 31 | 14 lb/gal (Foamed, With Fibers) | 27 | 13 |
| 28 | 12 lb/gal (Foamed, No Fibers) | 26 | 7 |
| 24 | 12 lb/gal (Foamed, With Fibers) | 19 | 21 |
| 29 | 10 lb/gal (Foamed, No Fibers) | 27 | 7 |
| 28.5 | 10 lb/gal (Foamed, With Fibers) | 26.2 | 8 |

From Table I, it can be seen that the presence of fibers in the non-foamed and foamed spacer fluids provides greater efficiency in removing drilling fluid.

TABLE II

Filter Cake Erosion By Spacer 2 Fluids With and Without Fibers

| Drilling Fluid Filter Cake Weight, grams | Spacer 2 Fluid Tested | Weight of Drilling Fluid After Spacer 2 Circulation, grams | Percent of Filter Cake Removal After Spacer 2 Circulation |
|---|---|---|---|
| 18.5 | 16 lb/gal (No Fibers) | 17.7 | 4 |
| 19.8 | 16 lb/gal (With Fibers) | 18.0 | 9 |
| 12.8 | 14 lb/gal (Foamed, No Fibers) | 12.7 | 1 |
| 15.4 | 14 lb/gal (Foamed, With Fibers) | 13.7 | 11 |
| 16.9 | 12 lb/gal (Foamed, No Fibers) | 14.7 | 13 |
| 15.9 | 12 lb/gal (Foamed, With Fibers) | 13.0 | 18 |
| 23.5 | 10 lb/gal (Foamed, No Fibers) | 20.8 | 11 |
| 19.2 | 10 lb/gal (Foamed, With Fibers) | 16.8 | 12.5 |

From Table II, it can again be seen that the presence of fibers in the non-foamed and foamed spacer fluids provides greater efficiency in removing drilling fluid.

What is claimed is:

1. A method of displacing a first fluid from a well bore with an incompatible second fluid comprising the steps of:
    placing a spacer fluid between said first and second fluids to separate said first and second fluids and to remove said first fluid from the walls of said well bore, said spacer fluid comprising water, a weighting material, a dispersing agent, a suspending agent and friction reducer, and fibers selected from the group consisting of polyester fibers, polyamide fibers, polyethylene fibers, polypropylene fibers, and other polyolefin fibers; and
    displacing said first fluid and said spacer fluid from said well bore with said second fluid.

2. The method of claim 1 wherein said water is selected from the group consisting of fresh water and salt water.

3. The method of claim 1 wherein said weighting material is selected from the group consisting of barium sulfate, hematite, manganese tetraoxide and calcium carbonate.

4. The method of claim 1 wherein said weighting material is barium sulfate.

5. The method of claim 1 wherein said weighting material is present in said spacer fluid in an amount up to about 745 pounds per barrel of said water therein.

6. The method of claim 1 wherein said dispersing agent is selected from the group consisting of naphthalene sulfonate condensed with formaldehyde, sodium polyacrylate, a terpolymer of acrylic acid, alkyloxybenzene sulfonate and methally sulfonate, formaldehyde, acetone, bisulfite condensate, melamine sulfonate formaldehyde condensate, and mixtures thereof.

7. The method of claim 1 wherein said dispersing agent is naphthalene sulfonate condensed with formaldehyde.

8. The method of claim 1 wherein said dispersing agent is present in said spacer fluid in an amount in the range of from about 0.5% to about 5% by weight of said water therein.

9. The method of claim 1 wherein said suspending agent and friction reducer is selected from the group consisting of sepiolite, whelan gum, xanthan gum, hydroxyethyl cellulose, bentonite, attapulgite, and mixtures thereof.

10. The method of claim 1 wherein, said suspending agent and friction reducer is xanthan gum.

11. The method of claim 1 wherein said suspending agent and friction reducer is present in said spacer fluid in an amount in the range of from about 2 pounds to about 10 pounds per barrel of said water therein.

12. The method of claim 1 wherein said fibers comprise polyolefin fibers.

13. The method of claim 1 wherein said fibers comprise hydrophilic polypropylene fibers.

14. The method of claim 1 wherein said fibers are present in said spacer fluid in an amount in the range of from about 1/16 pound to about 1/4 pound per barrel of spacer fluid.

15. The method of claim 1 wherein said spacer fluid further comprises a well bore wall scouring material selected from the group consisting of diatomaceous earth, crystalline silica, amorphous silica, and mixtures thereof.

16. The method of claim 15 wherein said scouring material is amorphous silica.

17. The method of claim 15 wherein said scouring material is present in said spacer fluid in the range of from about 10 pounds to about 80 pounds per barrel of said water therein.

18. The method of claim 1 wherein said spacer fluid further comprises a defoamer.

19. The method of claim 18 wherein said defoamer comprises oil and silica.

20. The method of claim 18 wherein said defoamer is present in said spacer fluid in an amount in the range of from about 0.5% to about 2% by weight of said water therein.

21. The method of claim 1 wherein said spacer fluid further comprises a spacer mixing aid blend.

22. The method of claim 21 wherein said spacer mixing aid blend comprises xanthan gum, mineral oil, olephilic clay, nonyiphenol with three moles of ethylene oxide, and a naphthalene sulfonate condensed with formaldehyde dispersing agent.

23. The method of claim 1 wherein said spacer fluid further comprises a foaming and foam stabilizing surfactant and a gas whereby said spacer fluid is foamed.

24. The method of claim 23 wherein said foaming and foam stabilizing surfactant is a mixture of an ethoxylated alcohol ether sulfate surfactant, an alkyl or alkene amidopropyl betaine surfactant and an alkyl or alkene amidopropyl dimethyl amine oxide surfactant.

25. The method of claim 23 wherein said foaming and foam stabilizing surfactant is present in said foamed spacer fluid in an amount in the range of from about 0.5% to about 5% by weight of said water therein.

26. The method of claim 23 wherein said gas is nitrogen.

27. The method of claim 23 wherein said gas is present in said foamed spacer fluid in an amount in the range of from about 5% to about 80% by volume of said water therein.

28. The method of claim 1 wherein said first fluid is a drilling fluid.

29. The method of claim 28 wherein said drilling fluid is selected from the group consisting of water based drilling fluids, oil based drilling fluids and foamed water based or oil based drilling fluids.

30. The method of claim 1 wherein said second fluid is a hydraulic cement slurry comprising water and cement.

31. The method of claim 30 wherein said hydraulic cement is selected from the group consisting of Portland cements, slag cements, pozzolana cements, gypsum cements, aluminous cements, silica cements and alkaline cements.

32. The method of claim 30 wherein said cement is Portland cement.

33. The method of claim 30 wherein said water is selected from the group consisting of fresh water and salt water.

34. A method of displacing drilling fluid from a well bore with a hydraulic cement slurry comprising the steps of:
    placing a foamed spacer fluid between said drilling fluid and said hydraulic cement slurry to separate said drilling fluid from said hydraulic cement slurry and to remove drilling fluid and filter cake from the walls of said well bore, said foamed spacer fluid comprising water, a weighting material, a dispersing agent, a suspending agent and friction reducer, fibers, a foaming and foam stabilizing surfactant, and a gas whereby said spacer fluid is foamed; and
    displacing said drilling fluid and said foamed spacer fluid from said well bore with said hydraulic cement slurry.

35. The method of claim 34 wherein said water is selected from the group consisting of fresh water and salt water.

36. The method of claim 34 wherein said weighting material is selected from the group consisting of barium sulfate, hematite, manganese tetraoxide and calcium carbonate.

37. The method of claim 34 wherein said weighting material is barium sulfate.

38. The method of claim 34 wherein said weighting material is present in said spacer fluid in an amount up to about 745 pounds per barrel of said water therein.

39. The method of claim 34 wherein said dispersing agent is selected from the group consisting of naphthalene sulfonate condensed with formaldehyde, sodium poly acrylate, a terpolymer of acrylic acid, alkyloxybenzene sulfonate and methally sulfonate, formaldehyde, acetone, bisulfite condensate, melamine formaldehyde condensate, and mixtures there.

40. The method of claim 34 wherein said dispersing agent is naphthalene sulfonate condensed with formaldehyde.

41. The method of claim 34 wherein said dispersing agent is present in said spacer fluid in an amount in the range of from about 0.5% to about 5% by weight of said water therein.

42. The method of claim 34 wherein said suspending agent and friction reducer is selected from the group consisting of sepiolite, whelan gum, xanthan gum, hydroxyethyl cellulose, bentonite, attapulgite, and mixtures thereof.

43. The method of claim 34 wherein said suspending agent and friction reducer is xanthan gum.

44. The method of claim 34 wherein said suspending agent and friction reducer is present in said spacer fluid in an amount in the range of from about 2 pounds to about 10 pounds per barrel of said water therein.

45. The method of claim 34 wherein said fibers are selected-from the group consisting of polyester fibers, polyamide fibers, polyethylene fibers, polypropylene fibers, and other polyolefin fibers.

46. The method of claim 34 wherein said fibers comprise hydrophilic polypropylene fibers.

47. The method of claim 34 wherein said fibers are present in said spacer fluid in an amount in the range of from about $\frac{1}{16}$ pound to about $\frac{1}{4}$ pound per barrel of spacer fluid.

48. The method of claim 34 wherein said foaming and foam stabilizing surfactant is a mixture of an ethoxylated alcohol ether sulfate surfactant, an alkyl or alkene, amidopropyl betaine surfactant and an alkyl or alkene amidopropyl dimethyl amine oxide surfactant.

49. The method of claim 34 wherein said foaming and foam stabilizing surfactant is present in said foamed spacer fluid in an amount in the range of from about 0.5% to about 5% by weight of said water therein.

50. The method of claim 34 wherein said gas is nitrogen.

51. The method of claim 34 wherein said gas is present in said foamed spacer fluid in an amount in the range of from about 5% to about 80% by volume of said water therein.

52. The method of claim 34 wherein said drilling fluid is selected from the group consisting of water based drilling fluids, oil based drilling fluids and foamed water based or oil based drilling fluids.

53. The method of claim 34 wherein said hydraulic cement is selected from the group consisting of Portland cements, slag cements, pozzolana cements, gypsum cements, aluminous cements, silica cements and alkaline cements.

54. The method of claim 34 wherein said cement is Portland cement.

55. The method of claim 34 wherein said water in said slurry is said water is selected from the group consisting of fresh water and salt water.

56. A method of displacing fluids in a well bore comprising:
    placing a foamed spacer fluid comprising fibers selected from, the group consisting of polyester fibers, polyamide fibers, polyethylene fibers, polypropylene fibers, and other polyolefin fibers, between first and second fluids,; and
    displacing said first fluid and said spacer fluid from the well bore with said second fluid.

57. The method of claim 56 wherein said spacer fluid comprises water selected from the group consisting of fresh water and salt water.

58. The method of claim 56 wherein said spacer fluid comprises a weighting material selected from the group consisting of barium sulfate, hematite, manganese tetraoxide and calcium carbonate.

59. The method of claim 58 wherein said weighting material is present in said spacer fluid in an amount up to about 745 pounds per barrel of said water therein.

60. The method of claim 56 wherein said spacer fluid comprises a dispersing agent selected from the group consisting of naphthalene sulfonate condensed with formaldehyde, sodium polyacrylate, a terpolymer of acrylic acid, alkyloxybenzene sulfonate and methally sulfonate, formaldehyde, acetone, bisulfite condensate, melamine sulfonate formaldehyde condensate, and mixtures thereof.

61. The method of claim 60 wherein said dispersing agent is present in said spacer fluid in an amount in the range of from about 0.5% to about 5% by weight of said water therein.

62. The method of claim 56 wherein said spacer fluid comprises a suspending agent and friction reducer selected from the group consisting of sepiolite, whelan gum, xanthan gum, hydroxyethyl cellulose, bentonite, attapulgite, and mixtures thereof.

63. The method of claim 62 wherein said suspending agent and friction reducer is present in said spacer fluid in an amount in the range of from about 2 pounds to about 10 pounds per barrel of said water therein.

64. The method of claim 56 wherein said fibers comprise hydrophilic polypropylene fibers.

65. The method of claim 64 wherein said fibers are present in said spacer fluid in an amount in the range of from about 1/16 pound to about 1/4 pound per barrel of spacer fluid.

66. The method of claim 56 wherein said spacer fluid further comprises a well bore wall scouring material selected from the group consisting of diatomaceous earth, crystalline silica, amorphous silica, and mixtures thereof.

67. The method of claim 66 wherein said scouring material is amorphous silica.

68. The method of claim 66 wherein said scouring material is present in said spacer fluid in an amount in the range of from about 10 pounds to about 80 pounds per barrel of said water therein.

69. The method of claim 56 wherein said spacer fluid further comprises a spacer mixing aid blend.

70. The method of claim 69 wherein said spacer mixing aid blend comprises xanthan gum, mineral oil, olephilic clay, nonylphenol with three moles of ethylene oxide, and a naphthalene sulfonate condensed with formaldehyde dispersing agent.

71. The method of claim 56 wherein said spacer fluid further comprises a foaming and foam stabilizing surfactant and a gas whereby said spacer fluid is foamed.

72. The method of claim 71 wherein said foaming and foam stabilizing surfactant is a mixture of an ethoxylated alcohol ether sulfate surfactant, an alkyl or alkene amidopropyl betaine surfactant and an alkyl or alkene amidopropyl dimethyl amine oxide surfactant.

73. The method of claim 71 wherein said foaming and foam stabilizing surfactant is present in said foamed spacer fluid in an amount in the range of from about 0.5% to about 5% by weight of said water therein.

74. The method of claim 71 wherein said gas is nitrogen.

75. The method of claim 71 wherein said gas is present in said foamed spacer fluid in an amount in the range of from about 5% to about 80% by volume of said water therein.

76. The method of claim 56 wherein said first fluid is a drilling fluid.

77. The method of claim 76 wherein said drilling fluid is selected from the group consisting of water based drilling fluids, oil based drilling fluids and foamed water based or oil based drilling fluids.

78. The method of claim 56 wherein said second fluid is a hydraulic cement slurry comprising water and cement.

79. The method of claim 78 wherein said hydraulic cement is selected from the group consisting of Portland cements, slag cements, pozzolana cements, gypsum cements, aluminous cements, silica cements and alkaline cements.

80. The method of claim 78 wherein said water is selected from the group consisting of fresh water and salt water.

* * * * *